March 12, 1968 G. W. JACKSON 3,372,919
AUTOMATIC VEHICLE LEVELING SYSTEM
Original Filed Nov. 2, 1964 2 Sheets-Sheet 1

INVENTOR.
George W. Jackson
BY
J. C. Evans
His Attorney

March 12, 1968     G. W. JACKSON     3,372,919

AUTOMATIC VEHICLE LEVELING SYSTEM

Original Filed Nov. 2, 1964     2 Sheets-Sheet 2

INVENTOR.
George W. Jackson
BY
*J. C. Evans*
His Attorney

United States Patent Office 3,372,919
Patented Mar. 12, 1968

3,372,919
AUTOMATIC VEHICLE LEVELING SYSTEM
George W. Jackson, Dayton, Ohio, assignor to General Motors Corporation, Detroit, Mich., a corporation of Delaware
Continuation of application Ser. No. 408,218, Nov. 2, 1964. This application July 29, 1966, Ser. No. 568,978
11 Claims. (Cl. 267—65)

This application is a continuation of Ser. No. 408,218, filed Nov. 2, 1964, now abandoned.

This invention relates to an auxiliary suspension system for maintaining a desired predetermined height relationship between the sprung and the unsprung masses of a motor vehicle or the like and more particularly to a system of this type having combination shock absorber and air spring units operatively associated with a closed pressure system including means responsive to changes in the weight of the sprung mass for adjusting pressure in the air spring unit.

One problem in many spring suspension systems that support the body of a motor vehicle with respect to its axle and ground engaging wheels is that as the load distribution in the body changes, the height relationship between the body and axle and road engaging wheel structure moves from a preselected desired height relationship. In such a case, the shock absorber units supported between the sprung and unsprung masses for damping the movements thereof have a reduced effectiveness as a vehicle movement damping device; furthermore, such a change from the desired height relationship affects general riding qualities inherent in vehicle suspension systems of this type.

An object of the present invention, therefore, is to automatically hold a desired vehicle height by a simplified vehicle leveling system including a combination shock absorber and air spring unit associated with a closed pressure system including an hermetically sealed compressor that continuously directs pressurized fluid to a pressurized supply tank and an inlet reservoir for receiving fluid from the air spring unit and wherein the volume ratio between the closed system and the air spring unit is such that the air spring unit will be maintained between predetermined pressure levels with a predetermined amount of compressible fluid in the closed system.

A further object of the present invention is to provide a combination shock absorber and air spring unit for automatically leveling vehicles including a closed pressure system for pressurizing the air spring unit including a continuously driven compressor and valve means for pulsatingly directing pressurized fluid from the air spring unit for modulating the pressure in the air spring unit in response to the weight of a sprung mass leveled by the combination unit.

Further objects and advantages of the present invention will be apparent from the following description, reference being had to the accompanying drawings wherein a preferred embodiment of the present invention is clearly shown.

Figure 1:
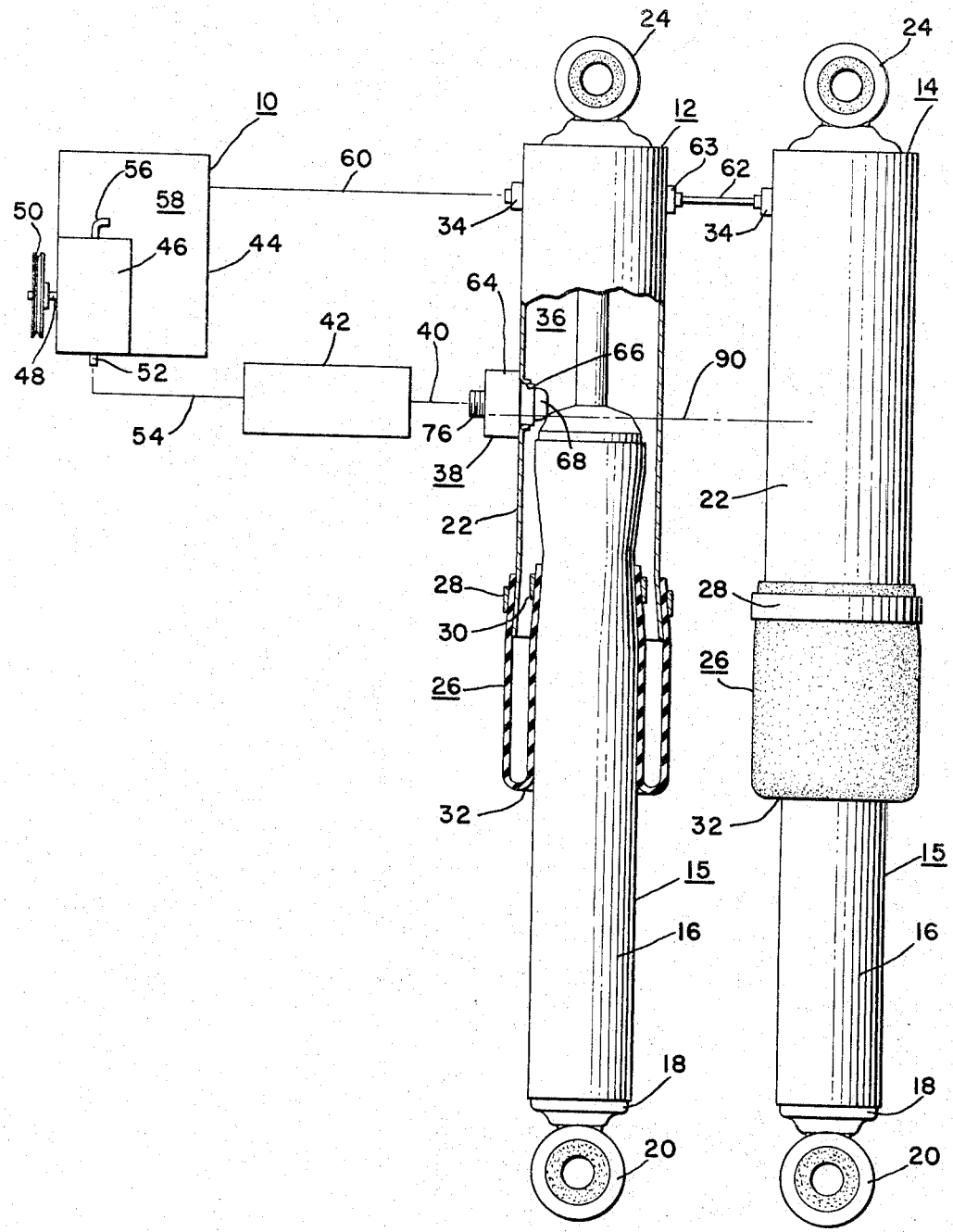
FIGURE 1 is a view in vertical section of a combination shock absorber and air spring unit having the improved pressurization system of the present invention.

Referring now to the drawings, in FIGURE 1, an improved automatic leveling system 10 is illustrated including a pair of combination shock absorber and air spring units 12, 14. Each of the units 12, 14 includes a shock absorber 15 having an outer cylindrical member 16 having a bottom open end closed by a cap element 18 that is secured to a bearing mount 20 adapted to be connected to the unsprung mass of a vehicle, for example, that part represented by the axle and wheel assembly of an automobile. The units 12, 14 each also includes a tubular dust shield 22 that surrounds the shock absorber cylinder 16 in coaxial alignment therewith. The shield 22 at the upper end thereof is connected to an upper bearing mount 24 that is adapted to be connected to a sprung mass such as the body of an automobile. In the illustrated arrangement, a flexible sleeve 26 of resilient material has one end thereof fastened to the outer surface of the end of the dust shield 22 by a clamp member 28 and the opposite end thereof turned inwardly of the shield 22 where it is fastened about the cylinder 16 near the upper end thereof by a clamp member 30. The inner and outer parts of the flexible sleeve 26 are thereby joined by a reverse or return bend portion 32 that moves upwardly and downwardly with respect to cylinder 16 during the automatic leveling operation of the system 10.

In the illustrated arrangement, the dust shield supports an inlet fitting 34 for directing pressurized fluid into a pressurizable chamber 36 formed by the tubular shield member 22 in cooperation with the flexible sleeve 26 and the shock absorber cylinder 16.

The aforementioned details of construction of the combination shock absorber and air spring units 12, 14 are like those disclosed in Patent No. 3,063,701, issued Nov. 13, 1962, to Paul J. Long, Jr., which should be referred to for a complete description of such combination shock absorber units. These details are cited in order to explain the present invention, it being understood that they are merely representative of one assembly that is useful in the novel combination.

In the illustrated arrangement, the leveling system 10 is illustrated as including a return or exhaust valve assembly 38 supported on the tubular dust shield 22 exteriorly thereof approximately intermediate the ends thereof. The valve assembly 38 is connected by a line 40 to an inlet reservoir 42 for receiving pressurized fluid bled from the pressurizable chamber 36. A compressor shell 44 has a rotary compressor 46 supported interiorly thereof with a drive shaft 48 directed exteriorly of the enclosure 44, where it is fastened to a pulley 50 adapted to be belted to a suitable drive.

The compressor 46 has an inlet 52 thereto connected by a line 54 to the inlet reservoir 42 and includes an outlet opening or fitting 56 discharging directly into a pressurizable chamber 58 formed by the shell 44. From the shell 44, pressurized fluid is directed through a line 60 connected to the inlet fitting 34 on unit 12. A balancing line 62 connects between a fitting 63 on unit 14 and the fitting 34 on unit 12 to maintain substantially equal pressures in chambers 36.

Figure 2:
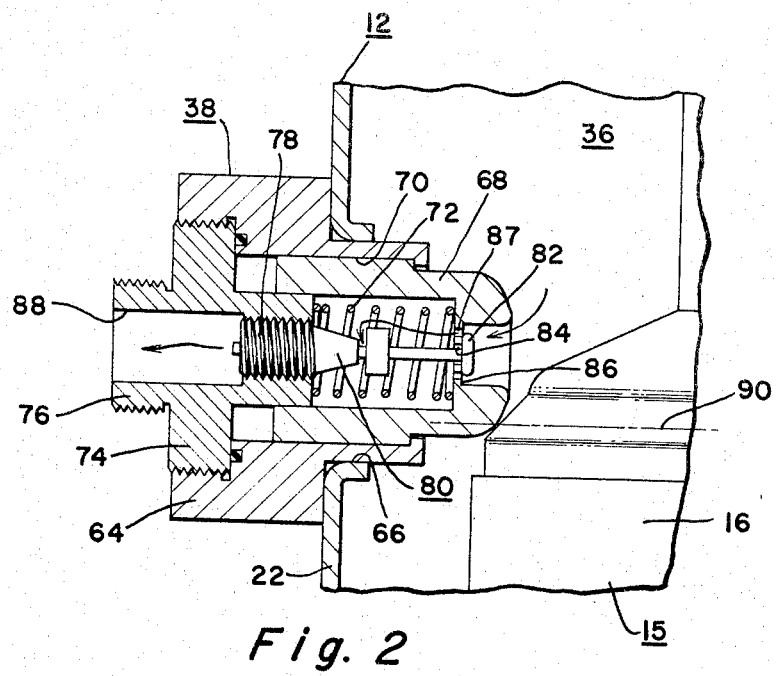
FIGURE 2 is an enlarged, fragmentary, sectional view of the control valve in the present invention in an opened position.
Figure 3:
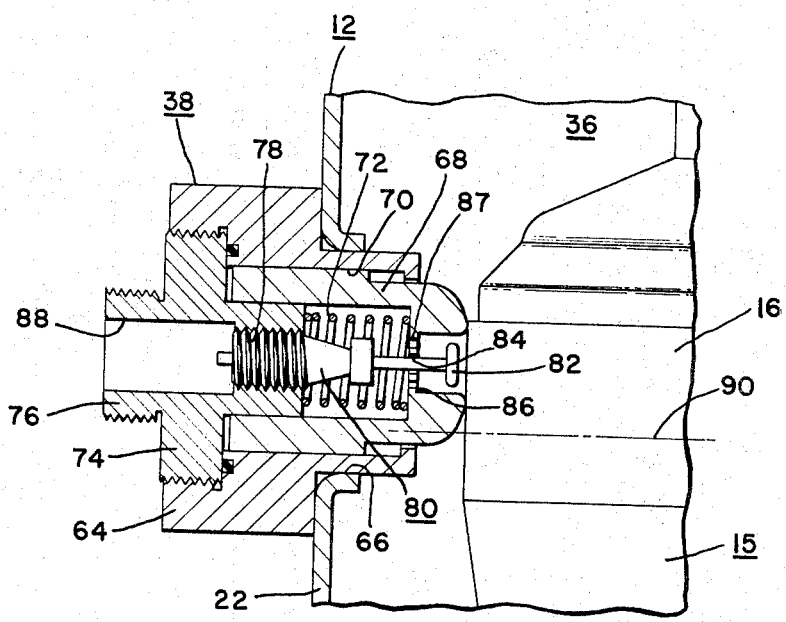
FIGURE 3 is an enlarged, fragmentary, sectional view of the control valve in a closed position.

According to certain of the principles of the present invention, the valve assembly 38 serves to pulsatingly control the pressure level in the pressurizable chamber 36 in accordance with the weight of the sprung mass to be leveled by the units 12, 14. More particularly, the valve 38, as best illustrated in FIGURES 2 and 3, includes an outer tubular housing 64 that has a small diameter end thereof directed through an opening 66 in the tubular dust shield 22 in supported relationship therewith. The housing 64 encloses a movable actuator element 68 that is slidably supported within an opening 70 therein. The movable member 68, as shown in FIGURE 3, contacts the outer surface of the shock absorber 15 where it is held by an interiorly located biasing spring 72 having one end in engagement therewith and an opposite end thereof engaged by a tubular fitting 74 threadably received in the opened outer end of housing 64. The fitting 74 has a threaded outer end 76 adapted to be connected to the line 40 and an internally threaded inner end 78 which supportingly receives a common tire type of valve assembly 80 including a movable stem 82 directed coaxially through an opening 84 through the movable actuator member 68. The head of the stem 82 is selectively engageable by an annular lip 86 that in part forms opening 84 in the member 68 and also includes inlet openings 87 therein. Movement of stem 82 outwardly of the housing of assembly 80 opens the valve and reverse movement closes it. When the valve assembly 80 is opened, it allows fluid flow therethrough through an opening 88 in the valve fitting 74 to the line 40.

As best shown in FIGURE 2, when the valving assembly 38 is moved up the outer surface of the shock absorber unit, the movable valving element 68 is forced inwardly by the spring 72 to cause the lip 86 to move the stem 82 into its valve opening position to thereby produce a predetermined discharge of fluid from the pressurizable chamber 36. As is illustrated in FIGURE 1, the combination shock absorber and air spring unit preferably is positioned between the unsprung and sprung masses so that the shock absorber will have a good compression and rebound damping action during high frequency relative movement of the sprung mass with respect to the unsprung mass like that produced by normal body movement present during ordinary vehicle travel. In this position, the valving assembly 38 is at a control point or level 90 above which the valve opens and below which the valve is closed.

As the weight of the sprung mass changes as, for example, when additional passengers are seated in the rear seat of an automobile, the main suspension system is compressed to cause the sprung mass to move closer to the unsprung mass away from the desired height relationship. By virtue of the valve assembly 38 a greater amount of the pressurized fluid is held in the pressurizable chamber 36 to inflate sleeve 26 and thereby move the sprung mass back to the desired height. Likewise, in cases where the vehicle is lightly loaded, the sprung mass will tend to be separated from the unsprung mass by the main suspension spring in which case the valve is opened almost continuously to reduce pressure in the chamber 36 to a point where the sprung masses are maintained level.

In accordance with certain of the principles of the present invention, the closed pressure system in the assembly 10 has a predetermined volume relationship between the reservoir 42, pressurizable chamber 44 and chamber 36 whereby when the system is in its normally inoperative position, it is maintained at a relatively low pressure, for example, 15 p.s.i., to prevent undesirable collapse of the inflatable, flexible sleeve member 26 on itself at the return bend portion 32.

The compressor 46 is continually driven, for example, off a power takeoff from a vehicle motor so that fluid is drawn from the reservoir 42 and discharged into the pressure chamber 58 for passage into the air spring chamber 36. The air spring unit is thereby continually pressurized to force the bearing mounts 20, 24 apart and thus cause the valving assembly 38 to move from its closed position in FIGURE 3 to its open position in FIGURE 2. When the valving element is in its opened position, it effectively returns all of the capacity of the compressor back to the inlet reservoir 42 so as to prevent overinflation of the units 12, 14. The valve assembly 38 thereby pulsatingly controls the flow of pressurized fluid from chambers 36 back to the reservoir 42 at a rate dependent upon the weight of the sprung mass. Hence, when the vehicle is lightly loaded, the valve will be continually moved across the control level to rapidly open and close so that it remains open for a substantial period of time to prevent overinflation and in cases where the unit is substantially loaded, the valve will pulsate about the control level line towards its closed position more often so as to maintain a higher pressure in the chamber 36 to support the added weight of the suspended mass at the desired predetermined height relationship.

Another feature of the invention is that the volume of the closed system 10 and the amount of compressible fluid therein is such that in cases where the combination shock absorber and air spring units are overloaded so that the valving assembly 38 is continually forced into a closed position, the compressor 46 will only raise the pressure in the pressurizable chamber 36 to a predetermined maximum point and thereafter it will tend to draw a vacuum on the suction side to prevent further pressurization of the combination units to thus avoid overpressurization thereof.

By virtue of the aforementioned representative embodiment of the present invention, it is apparent that a relatively simple continually operative leveling system is afforded by the present invention wherein the operative parts are effectively isolated from an undesirable ambient environment such as is found immediate the suspension systems of an automotive vehicle or the like and wherein immediate responsiveness is obtained by means of a reliable, weight responsive valving assembly that constantly pulsatingly maintains a desired average height relationship between the sprung and the unsprung masses of a vehicle.

While the embodiment of the present invention as herein disclosed constitutes a preferred form, it is to be understood that other forms might be adopted.

What is claimed is as follows:

1. An auxiliary suspension system comprising the combination of, a shock absorber having a cylinder portion and a piston rod portion reciprocal relative thereto, fluid spring means for producing a predetermined height relationship between said cylinder portion and said piston rod portion, a pressurized enclosure having compressor means therein with an outlet discharging interiorly of said enclosure, a fluid receiver fluidly communicated with the inlet to said compressor means, means for directing pressurized fluid from said pressurized enclosure interiorly of said fluid spring means, height control means including valve means for controlling flow of fluid from said fluid spring means back to said fluid receiver, said pressurized enclosure, fluid receiver, fluid spring and fluid directing means having a volume including a predetermined amount of compressible fluid wherein said system is maintained at a predetermined pressure when said compressor means is inoperative to prevent complete deflation of said fluid spring means, said volume and said predetermined amount of compressible fluid limiting the pressure buildup in said fluid spring means produced during operation of said compressor means.

2. In a supplemental suspension system, the combination of, a shock absorber having a cylindrical outer surface and a piston rod reciprocal relative thereto, an enclosure on said piston rod, a flexible tubular sleeve member having one end secured to said outer shock absorber surface and the other end thereof connected to said enclosure, said enclosure and said sleeve member forming a pressurizable chamber inflatable to produce relative movement between said outer surface and said piston rod, a fluid system including valve means for pulsatingly exhausting fluid from said pressurizable chamber, an inlet receiver for said exhausted fluid, a compressor having an inlet and an outlet, and means for fluidly communicating said valve means, inlet receiver, compressor and said pressurizable chamber in closed fluid flow relationship, said compressor operable to continuously direct pressurized fluid to said pressurizable chamber, said fluid system being pressurized to a first predetermined pressure when said compressor is inoperative, said system having a predetermined amount of compressible fluid therein whereby pressure in said pressurizable chamber is limited to a second predetermined maximum pressure.

3. An auxiliary suspension system for leveling a vehicle having a sprung and an unsprung mass comprising, the combination of, a shock absorber, pressurizable fluid spring means supported on said shock absorber and operatively arranged therewith to cause a predetermined movement between the opposite ends of said shock absorber, a closed fluid pressure system for inflating said fluid spring means including valve means for controlling flow of pressurized fluid from said fluid spring means, an inlet receiver, a compressor, a pressurized enclosure surrounding said compressor for receiving fluid discharged therefrom, and fluid conduit means for fluidly connecting said valve means, said inlet receiver, said compressor, said pressurized enclosure and said fluid spring means with each other in serial closed fluid flow relationship, said serially connected fluid system having a predetermined volume and a predetermined amount of compressible fluid therein for maintaining said system at a predetermined minimum pressure wherein said fluid spring means is partially inflated to prevent wear thereof, said compressor operable to continuously draw fluid from said inlet receiver for discharge into said pressurized enclosure for passage to said fluid spring means, said valve means being responsive to relative movement of the opposite ends of said shock absorber to control the flow of pressurized fluid from said fluid spring means back to said inlet receiver for maintaining a predetermined height relationship between a sprung and an unsprung mass associated with said shock absorber.

4. A supplemental suspension system for association with a vehicle having a sprung mass, an unsprung mass and a primary spring suspension, the combination of, fluid spring means having means on its opposite ends adapted to be connected to a sprung and an unsprung mass, said fluid spring means including a pressurizable chamber producing a predetermined relative movement between the ends thereof to supplement the load carrying capacity of the primary suspension system so as to maintain a desired height relationship between the sprung and unsprung masses, a closed fluid system including a compressor for pressurizing said fluid spring means including means responsive to the load of the sprung mass for maintaining said fluid spring means at a predetermined pressure corresponding to the load, said closed fluid system having a predetermined volume and a predetermined amount of compressible fluid wherein the system is initially maintained at a first predetermined pressure and operative to effect a varying pressurization of said fluid spring means up to a predetermined maximum point dependent upon the amount of compressible fluid in the closed system.

5. In a supplemental suspension system for association with a primary suspension system between a sprung and an unsprung mass, the combination of, a shock absorber having relatively movable end portions adapted to be connected to the sprung and unsprung masses respectively for damping relative movement therebetween, fluid spring means supported by said shock absorber and including pressurizable means for supplementing the load carrying capacity of the primary suspension means to maintain a desired height relationship between the sprung and unsprung masses, fluid control valve means for maintaining a predetermined pressure in said fluid spring means dependent upon the weight of the sprung mass, a closed fluid system including compressor means for supplying pressurized fluid to said fluid spring means, said closed system having a predetermined volume and amount of compressible fluid wherein said system and fluid spring means are maintained at a first predetermined pressure when said compressor is inoperative, means for driving said compressor means continuously to continuously direct pressurized fluid to said fluid spring means for effecting the supplemental load carrying action, said valve means responding to the weight of the sprung mass to pulsatingly control the fluid spring means pressurization so that the sprung and unsprung masses are continuously maintained at the desired height relationship.

6. In a supplemental suspension system for association with a primary suspension system between a sprung and an unsprung mass, the combniation of, a shock absorber having reltaively movable end portions adapted to be connected to the sprung and unsprung masses respectively for damping relative movement therebetween, fluid spring means supported by said shock absorber and including pressurizable means for supplemening the load carrying capacity of the primary suspension means to maintain a desired height relationship between the sprung and unsprung masses, fluid control valve means for maintaining a predetermined pressure in said pressurizable means dependent upon the weight of the sprung mass, a closed fluid system including compressor means for supplying pressurized fluid to said fluid spring means, said closed system having a predetermined volume and amount of compressible fluid therein wherein said system and fluid spring means are maintained at a first predetermined pressure when said compressor means is inoperative, means for driving said compressor means to direct pressurized fluid to said fluid spring means for effecting the supplemental load carrying action, said valve means responding to the weight of the sprung mass to pulsatingly control the fluid spring means pressurization so that the sprung and unsprung masses are maintained at a desired height relationship, said fluid system including means for receiving fluid from said pressurized fluid spring means, a pressurized enclosure receiving fluid from said compressor means, said receiving means and pressurized enclosure having a predetermined volume and a predetermined amount of compressible fluid therein to prevent overpressurization of said fluid spring means when the weight of the sprung mass exceeds a predetermined maximum value.

7. In a supplemental load carrying suspension system, the combination of, a shock absorber having opposite ends thereon adapted to be connected to the sprung and unsprung masses of a vehicle, fluid spring means on said shock absorber including a pressurizable chamber effective to produce a predetermined height relationship between the ends of said shock absorber, means for continuously directing pressurized fluid into said pressurizable chamber of said fluid spring means, valve means on said fluid spring means including a movable element for discharging the continuous influx of fluid exteriorly of said pressurizable fluid spring means chamber, coacting means on said spring means and said shock absorber for actuating said movable element to pulsatingly control deflation of said pressurizable chamber to maintain the predetermined height relationship between the ends of said shock absorber.

8. In a supplemental load carrying suspension system, the combination of, a shock absorber having opposite ends thereon adapted to be connected to the sprung and unsprung masses of a vehicle, fluid spring means supported by said shock absorber including a pressurizable chamber effective to produce a predetermined height relationship between the ends of said shock absorber, valve means carried by said fluid spring means including a movable element for discharging fluid exteriorly of said pressurizable fluid spring chamber, coacting means on said fluid spring means and said shock absorber for actuating said movable element to pulsatingly control deflation of said pressurizable chamber to maintain the desired height relationship between the ends of said shock absorber, and a looped fluid pressure system associated with said pressurizable fluid spring chamber including a compressor, an inlet receiver for supplying fluid to the inlet of said compressor and a pressurized enclosure for receiving fluid from said compressor and directing it interiorly of said pressurizable fluid spring chamber, said compressor operable continuously for directing a continuous predetermined flow of fluid into said fluid spring means, said valve means pulsatingly controlling discharge of pressurized fluid from the pressurizable fluid spring chamber to said receiver in response to the weight of the sprung mass to maintain the ends of said shock absorber at the predetermined height relationship, said valve means responding to increased spring loads by limiting the return flow to said receiver whereby an increased pressurization of said pressurizable chamber is effected to compensate for such additional loads.

9. In a supplemental load carrying suspension system, the combination of, a shock absorber having opposite ends thereon adapted to be connected to the sprung and unsprung masses of a vehicle, fluid spring means on said shock absorber including a rigid portion and a flexible portion forming a pressurizable chamber effective to produce a predetermined height relationship between the ends of said shock absorber, means for continuously directing pressurized fluid into said pressurizable chamber of said fluid spring means, valve means carried by said rigid portion of said fluid spring means for discharging fluid exteriorly of said pressurizable fluid spring chamber, said valve means including a movable actuator stem directed interiorly of said chamber, coacting means on said fluid spring means and said shock absorber for actuating said movable actuator stem to pulsatingly control deflation of said pressurizable chamber to maintain the desired height relationship, said valve means pulsing at a lesser rate upon increased loading to increase the pressure in said pressurizable chamber and pulsing at a greater rate upon reduced loading to reduce the pressure in said pressurizable fluid spring chamber.

10. In a supplemental load carrying suspension system for association with a sprung and an unsprung mass having an associated primary suspension system therebetween, the combination of, a shock absorber having ends thereof adapted to be connected respectively to the unsprung and sprung masses, fluid spring means carried by said shock absorber and operative to maintain a predetermined desired height relationship between the sprung and unsprung masses, said fluid spring means including a pressurizable chamber formed in part by the outer surface of said shock absorber unit, an inlet and an outlet to said pressurizable chamber, a looped fluid system for pressurizing said pressurizable chamber including an inlet receiver, a compressor, a pressurizable enclosure, and fluid means serially connecting said receiver, compressor, pressurizable enclosure, and the inlet and outlet from the pressurizable fluid spring chamber, control valve means for controlling fluid flow from said pressurizable chamber through said chamber outlet in accordance with the weight of the sprung mass, said compressor being continuously operable for discharging a continuous fluid stream into the pressurizable fluid spring chamber to cause a pressure increase therein, said valve means pulsatingly controlling fluid flow from said fluid spring chamber to maintain a pressure therein that effects the desired height relationship, said valve means pulsing at a lesser rate upon increased loading to increase the pressure in said pressurizable chamber and pulsing at a greater rate upon reduced loading to reduce the pressure in said pressurizable fluid spring chamber.

11. In a supplemental suspension system for association with a sprung and an unsprung mass supported at a desired height relationship by a primary suspension system, the combination of, a shock absorber having ends thereon adapted to be connected respectively to the sprung and unsprung masses, fluid spring means for maintaining a desired height relationship between the sprung and unsprung masses irrespective of changes in the weight of the sprung mass, a closed fluid pressure system for continuously supplying pressurized fluid to said fluid spring means including a continuously operating compressor and valve means for selectively discharging pressurized fluid from said fluid spring means in accordance with the weight of the sprung mass.

References Cited
UNITED STATES PATENTS

| | | | |
|---|---|---|---|
| 2,536,626 | 1/1951 | Coleman | 267—64 |
| 3,026,103 | 3/1962 | Gates | 267—65 |
| 3,120,962 | 2/1964 | Long | 267—64 |
| 3,173,671 | 3/1965 | Broadwell | 267—64 |

ARTHUR L. LA POINT, *Primary Examiner.*

R. M. WOHLFARTH, *Assistant Examiner.*